US005895927A

United States Patent [19]
Brown

[11] Patent Number: 5,895,927
[45] Date of Patent: Apr. 20, 1999

[54] ELECTRO-OPTIC, NONCONTACT, INTERIOR CROSS-SECTIONAL PROFILER

[75] Inventor: Jeff Lee Brown, Riverside, Ohio

[73] Assignee: The United States of America as represented by the Secretary of the Air Force, Washington, D.C.

[21] Appl. No.: 08/727,197

[22] Filed: Oct. 8, 1996

Related U.S. Application Data

[63] Continuation of application No. PCT/US96/11024, Jun. 27, 1996.
[60] Provisional application No. 60/000,717, Jun. 30, 1995, and provisional application No. 60/012,366, Feb. 27, 1996.

[51] Int. Cl.$^6$ .................................................. G01N 21/86
[52] U.S. Cl. ........................ 250/559.19; 250/559.22; 250/559.24; 356/376
[58] Field of Search .................. 250/559.19, 559.21, 250/559.22, 559.23, 559.24; 356/376, 384

[56] References Cited

U.S. PATENT DOCUMENTS

| | | | |
|---|---|---|---|
| 4,201,476 | 5/1980 | Musto et al. | 356/386 |
| 4,299,491 | 11/1981 | Waters et al. | 356/376 |
| 4,305,661 | 12/1981 | Pryor et al. | 356/241 |
| 4,381,152 | 4/1983 | Riech et al. | 356/385 |
| 4,432,648 | 2/1984 | Musto et al. | 356/387 |
| 4,453,082 | 6/1984 | Pryor | 250/561 |
| 4,461,576 | 7/1984 | King | 356/375 |
| 4,506,980 | 3/1985 | Pryor et al. | 356/237 |
| 4,583,000 | 4/1986 | Pryor | 250/561 |
| 4,659,937 | 4/1987 | Cielo et al. | 250/560 |
| 4,694,184 | 9/1987 | Pryor | 250/561 |
| 4,752,127 | 6/1988 | Zafred | 356/241 |
| 4,764,015 | 8/1988 | Bieringer et al. | 356/372 |

(List continued on next page.)

OTHER PUBLICATIONS

News Release, Farmington Hills, Michigan, "The Measure of the CMM Industry," May 24, 1994.
News Release, Rolling Meadows, Illinois, "Non–Contact Gauge Available for Use with Form Talysurf Series Form and Surface Texture Measurement System," May 24, 1994.
News Release, Mt. Kisco, New York, "Single Axis Gauging System Measures Diameter and Logs Production Events of Cable/Rod/Hose/Pipe," Jan. 3, 1994.
News Release, Blue Bell, Pennsylvania, "Contrologic Introduces the Si 3050 Mini Gauge The New Look of Performance in OD Gauging," Oct. 1, 1992.
News Release, Middletown, Connecticut, "A Division of ZYGO Acquired by LaserMike Inc.," Jul. 15, 1992.
News Release, Mt Kisco, New York, "Zumbach Introduces Compact Low–Priced Diameter Gauge," Mar. 30, 1992.
News Release, Mt. Kisco, New York, "Zumbach Introduces Ultra Compact Non–Contact Diameter Gauge," Jan. 28, 1991.
News Release, Minneapolis, Minnesota, "Non–Contact Infrared Dimensional Gauge Available from Applications Techniques Industrielles," Aug. 27, 1990.

(List continued on next page.)

*Primary Examiner*—Edward P. Westin
*Assistant Examiner*—Kevin Pyo
*Attorney, Agent, or Firm*—Thompson Hine & Flory LLP

[57] ABSTRACT

An electro-optic, noncontact, interior cross-sectional profiler (a "probe") and method of using the probe to determine the physical characteristics, such as interior dimensions, of an interior surface of a tubular structure, such as pipe, tubing, gun barrels and the like. The probe utilizes a disc of unfocused light to illuminate a cross-section of the interior surface and images the illuminated cross-section from the interior surface to a photodetector array, where the image can be evaluated. The probe is useful for off-line and on-line (or "in-line") processes, such as an extrusion process.

47 Claims, 7 Drawing Sheets

U.S. PATENT DOCUMENTS

| | | | |
|---|---|---|---|
| 4,938,599 | 7/1990 | Goszyk | 356/387 |
| 5,004,339 | 4/1991 | Pryor et al. | 356/241 |
| 5,239,366 | 8/1993 | Kittell et al. | 356/376 |
| 5,263,110 | 11/1993 | Anderson | 385/117 |
| 5,313,936 | 5/1994 | Miyazaki et al. | 128/6 |
| 5,325,177 | 6/1994 | Peterson | 356/357 |
| 5,392,122 | 2/1995 | Ulanov et al. | 356/372 |
| 5,440,393 | 8/1995 | Wenz | 356/376 |
| 5,543,972 | 8/1996 | Kamewada | 359/834 |

OTHER PUBLICATIONS

News Release, Middlefield, Connecticut, "Zygo Introduces New Processor for Noncontact Laser Dimension Sensors," Apr. 6, 1990.

News Release, "Lumonics Adds Two New Advanced Products," May 13, 1994.

*Glass*, Mar. 1993, p. 107, "Bottle Dimension Analysis."

*Glass* Feb. 1993, p. 55, "Holloware Inspection; W World: Article Discusses New Optical Inspection Equip for Glass Mfg Use."

ELECTRO-OPTIC, NONCONTACT, INTERIOR CROSS-SECTIONAL PROFILER

This application is a continuation of International Application No. PCT/US96/11024, filed Jun. 27, 1996, which international application claims the benefit of U.S. Provisional Application No. 60/000,717, filed Jun. 30, 1995, and U.S. Provisional Application No. 60/012,366, filed Feb. 27, 1996.

BACKGROUND OF THE INVENTION

The present invention relates to a method for using an apparatus for profiling and dimensionalizing an interior cross-sectional portion of a tubular structure and the apparatus itself and, more particularly, to a noncontact method for profiling a tubular structure in off-line-and on-line (or "in-line") processes.

Present methods of measuring inside dimensions of tubular structures employ bore gauges, inside calipers, stylus profilometers, and ultrasonic techniques.

Bore gauges, stylus profilometers, and inside calipers all work on the principal of one or more tips contacting the inside surface of a tubular structure such that dimensions are determined by the amount of calibrated extension or translation the tips make relative to a reference position. Bore gauges typically have two or three tips or fingers 180° or 120° apart respectively, which contact the inner surfaces and are calibrated to read out inside diameters. While bore gauges are very precise, they are best suited for measuring rigid cylindrical structures and not well suited for measuring complex interior shapes or for measuring structures with soft or elastic inner surfaces such as rubber.

A modification of a bore gauge is a set of plugs of various diameters, which are inserted into a tubular structure until the closest match is found. These gauges can only measure the minor diameter of a tubular structure, that is, the smallest diameter of a tubular structure which does not have a circular cross section. In addition, a wide range of plug sizes is required for high precision work. The use of plugs requires the work piece to be in a stationary state.

Calipers work in a similar manner as bore gauges but usually are not designed to extend more than a few inches into a tubular structure and are also not well suited for measuring noncircular cross sections or soft materials. Furthermore, use of calipers relies on human feel, which contributes to inaccuracy in measurements and lack of repeatability in measurements.

Stylus profilometers trace out dimensions by translating a stylus tip over the surface and can be used inside tubular structures by extending the tip on long extension arms. The drawback to this method is that stylus profilometers are better suited for measurements along the axis of a tubular structure rather than measurements of cross-sectional profiles. Either the part or the profilometer would have to be rotated about the axis of the tubular structure, which poses serious mechanical and registration problems. Profilometers can determine the shape and relative dimensions of the interior of tubular structures, but absolute diameters are more difficult.

In addition to the above limitations, all of the devices discussed so far make contact with the surface being measured. Bore gauges, plug gauges and calipers cannot be used to measure moving parts. Furthermore, stylus profilometers are too slow to make cross-sectional dimensional measurements on moving parts. If the part to be measured is moving, such as during extrusion or tube forming, contact methods are inappropriate because they may disturb the process, they may come in contact with material that is viscous or not completely set, or the measurement may be biased by the motion of the moving part.

Ultrasonic detection is a noncontact technique which works by measuring the time of flight of a sound pulse from a transmitter to a receiver when the sound bounces off boundaries between materials of different density. In the case of tubular structures with more or less constant wall thickness, ultrasonic detectors can detect reflections off the exterior and interior walls of the tubular structure thereby measuring wall thickness via time of flight measurements of the sound pulse. Wall thickness combined with outside measurements indirectly determines inside diameter. However, ultrasonic techniques have low spatial resolution such that a complex interior structure would tend to appear as an average wall thickness, so ultrasonic techniques are best suited for nominally cylindrical structures. Low density materials such as rubber and plastic can be difficult to measure with ultrasonics since the magnitude of reflected sound is small when the density difference at a boundary is small. Tubular structures made up of layered materials can also pose problems. In general, ultrasonic measurements are carried out under water or other suitable liquid medium, which further limits the application possibilities. Ultrasonic techniques can also be too expensive for many applications.

Another device that could potentially be employed, if interior dimensions are large enough, is a standard laser displacement sensor head which measures displacement by triangulation, but these devices are typically several inches long and require a certain standoff distance which limits their use inside tubular structures to minimum clearances of about four to five inches in diameter.

Current state-of-the-art laser triangulation sensors measure displacements of a surface toward and away from the sensor head by emitting a laser beam which illuminates a spot on the surface. An optical imaging subsystem views the laser spot along a line of sight that is not parallel to the laser beam. The beam spot is imaged onto a position sensitive detector (PSD). As the distance between the surface and sensor changes along the laser beam direction, the imaged laser spot moves laterally along the PSD. The electrical output of the PSD is proportional to the position of the imaged laser spot on its light sensitive area which in turn is proportional to the distance between the sensor and the surface.

A more recent attempt at determining physical characteristics of an inside surface of a bore having an extremely small diameter is disclosed in U.S. Pat. No. 5,004,339 to Pryor et al. Pryor et al. discloses an apparatus that utilizes a guided wave parabolic index fiber to permit the transportation of light into a bore, such as a human throat or vein, for determining the physical characteristics of the throat or vein. This apparatus is similar to an endoscope. The light is focused directly by a spherical mirror onto the interior surface of the throat or vein. As a result of the focusing of the light, the range of interior diameters of bores that can be measured is inherently limited. In addition, this reference does not teach that the apparatus can be used in an on-line process, in other words, the bore is stationary.

Accordingly, there is a need for a manufacturing line tool for direct, noncontact measurement of interior cross-sectional dimensions in tubular structures, especially for complex interior surfaces like helical pump stators and gun barrel rifling; a noncontact measuring device for off-line and on-line process control, especially for soft materials and moving parts; a miniaturized device for use with small bores and tubular structures having small inside diameters; and a measuring tool that reduces scrap and provides quick, accurate and repeatable measurements.

SUMMARY OF THE INVENTION

The present invention is an electro-optic, noncontact, interior cross-sectional profiler (a "probe") and a method for using the probe to determine physical characteristics, such as interior cross-sectional dimensions, of tubular structures. Specifically, the present invention employs an electro-optic probe and sensor system, which can acquire an entire interior cross-section dimensional profile from a stationary probe or a moving probe translating along the axis of the tubular structure without rotation of the probe or tubular structure and without contacting the interior walls of the tubular structure.

The probe of the present invention, when stationary or translating along the axis of tubular structures that are being measured, is capable of probing tubular structures with smaller clearances than standard laser triangulation devices and tubular structures having larger interior diameters than is presently capable with stationary probes that utilize focused light to illuminate the interior surface. Probes that utilize focused light must be manufactured for a specific diameter and have little range, if stationary, or must be moved proximally or distally with respect to the interior surface of the tubular structure repetitively sampling portions of the desired cross-section.

It has been found that the probe and its method of use can be incorporated into an on-line, on-the-fly, process such as a rolling mill, extruder or similar continuous production process to monitor the interior cross-sectional dimensions of a tubular structure during the production process at set time intervals or continuously, thus allowing for real-time production control. In addition, the probe can be inserted into a stationary tubular structure or the tubular structure can be translated with respect to a stationary probe for off-line measuring.

A primary advantage of this invention is that it can measure interior cross-sectional dimensions without contacting interior surfaces. This is especially important for measuring tubular structures composed of soft materials and when there is relative motion between the probe and the structure being measured. Soft materials can distort when contacted, thereby biasing the measurement. Also, soft materials can be scratched or otherwise damaged if the probe and tubular structure are moved relative to one another during contact. Semisolid material could also be removed and adhere to a probe that contacts the surface. The probe of this invention and method of using the probe is not limited by the relative hardness of the material of interior surfaces, only by the material's ability to scatter light. It is the scattered light which is collected by the optical system and focused onto the photodetector.

In some preferred embodiments, this invention also has the advantage of remote sensing in that the probe is all optical and mechanical except at the detection end where the sensitive electronic parts are located. If constructed with state-of-the-art optical components, which can withstand moderately high temperatures, the all-optical end of the probe can be inserted into areas where the temperatures are significantly higher than ambient while the more sensitive electronics end remains cool in the ambient environment or is actively cooled by inexpensive methods. The all-optical end can also be constructed to withstand various other adverse environments such as high humidity and corrosive vapors or liquids.

A further advantage of this invention is that it is significantly smaller in overall diameter than standard laser triangulation methods because of its cylindrical design. Therefore, the probe can be used in small interior diameter applications and where access is limited by small openings.

This invention has several advantages over ultrasonic wall thickness measurement techniques. It doesn't require that the part being measured be immersed in a liquid medium; it has a spatial resolution (along the cylindrical axis) approximately equal to the width of the laser illumination disc, generally better than ultrasonic techniques, and is therefore more useful as a profiling device; it can be produced at a lower cost than the average ultrasonic system; it is not constrained by low density or layered materials unlike ultrasonic techniques that are very much affected by density and viscosity of the material; and it measures interior dimensions directly as opposed to measuring wall thickness and relying on an additional measurement of outside dimensions to measure interior dimensions.

Furthermore, the use of unfocused light to illuminate a cross-section of the interior surface of the tubular structure permits the measuring of a variety of tubular structures having a wider range of cross-sectional dimensions, for example, diameters, unlike probes that employ focused light to illuminate the cross-sections.

The probe of the present invention also provides a quick, accurate and repeatable measuring tool that reduces scrap and enhances product performance.

In accordance with one embodiment of the present invention, a method for determining a physical characteristic of an interior surface of a tubular structure comprises the steps of:

providing a probe capable of insertion into the tubular structure, such that the probe does not contact the interior surface of the tubular structure;

illuminating a cross-section of the interior surface with a disc of unfocused light emitted from the probe;

imaging the illuminated cross-section from the interior surface onto a photodetector array;

scanning the array to determine an output of the array; and comparing the output to a known standard output or to other portions of the image of the illuminated cross-section to determine the physical characteristic of the interior surface.

DETAILED DESCRIPTION

The term "light" refers to light in any form, such as a light beam.

The step of scanning the array to determine the output of the array can be accomplished by any means known in the art. Preferably, a frame grabber is used to capture a profile image of the illuminated cross-section from the array.

The step of comparing the illuminated cross-section captured by the frame grabber to known standards or to other portions of the illuminated cross-section to determine a physical characteristic of the interior surface of the tubular structure can be accomplished by any means known in the art. Preferably, computer software is used to process the data from the image captured by the frame grabber and to output desired information.

Figure 1:
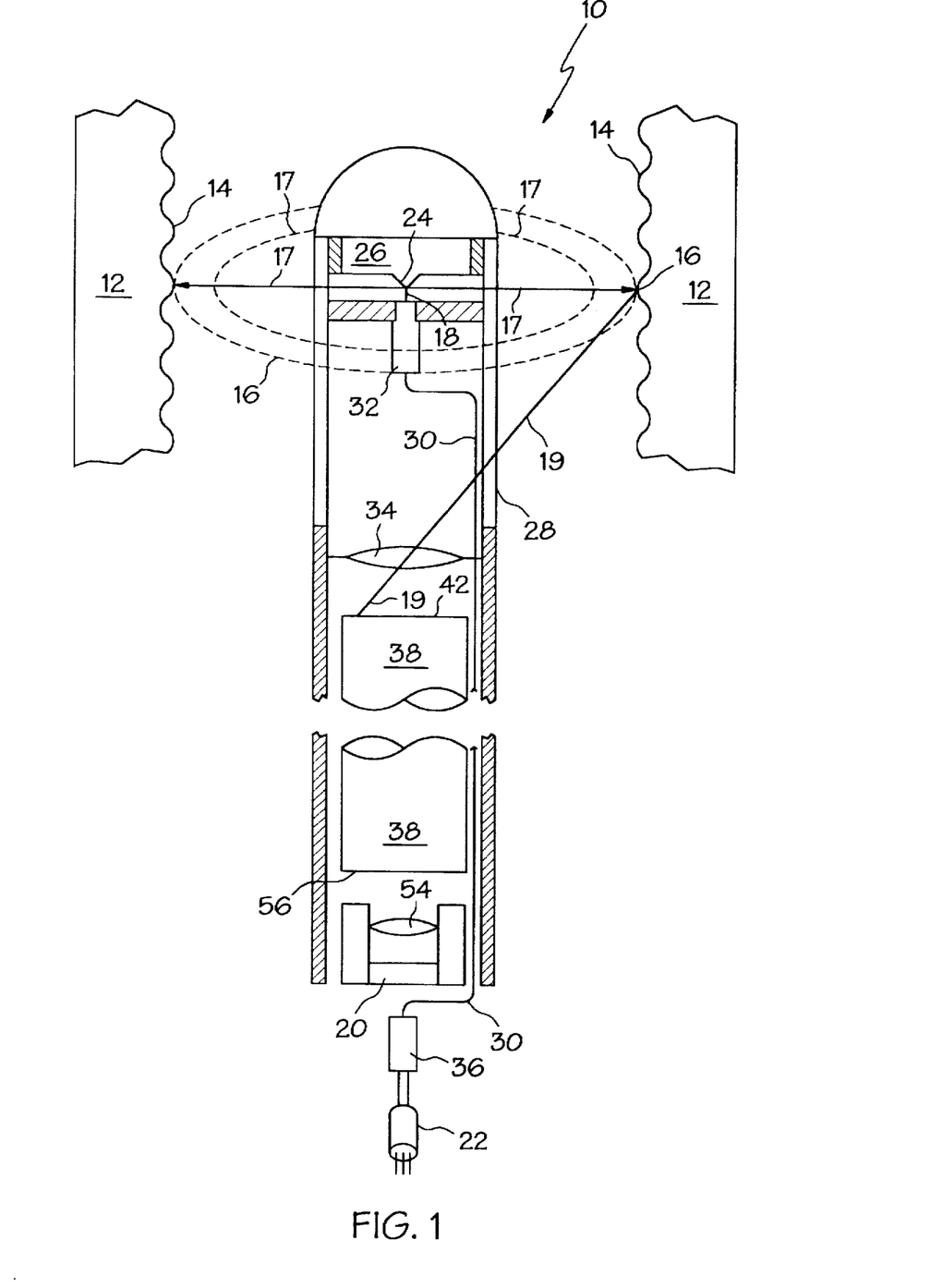
FIG. 1 is a diagrammatic, side elevation view, partially in section, of a first embodiment of a probe in accordance with the present invention.
Figure 2:
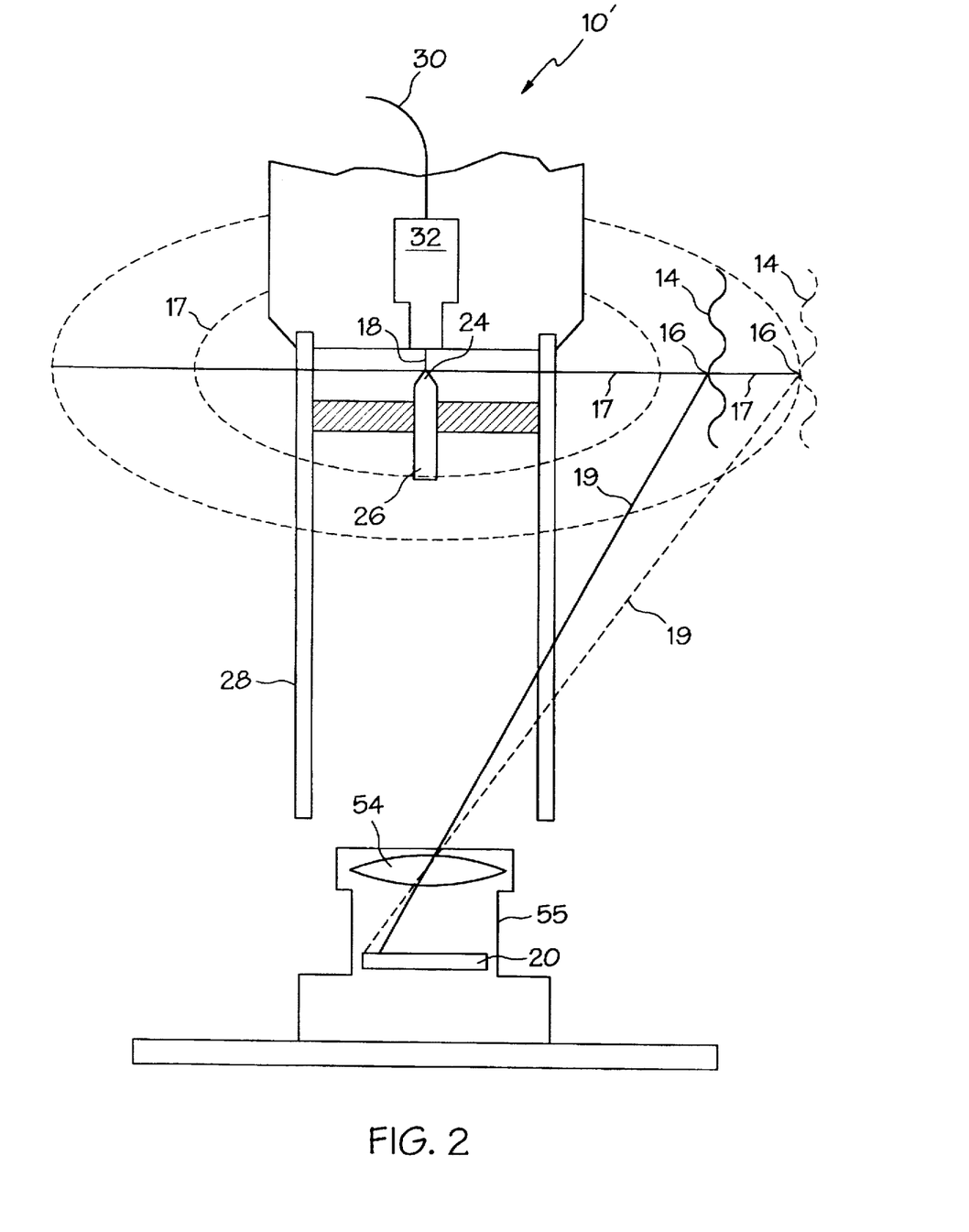
FIG. 2 is a diagrammatic, side elevation view, partially in section, of a second embodiment of a probe in accordance with the present invention.
Figure 3:
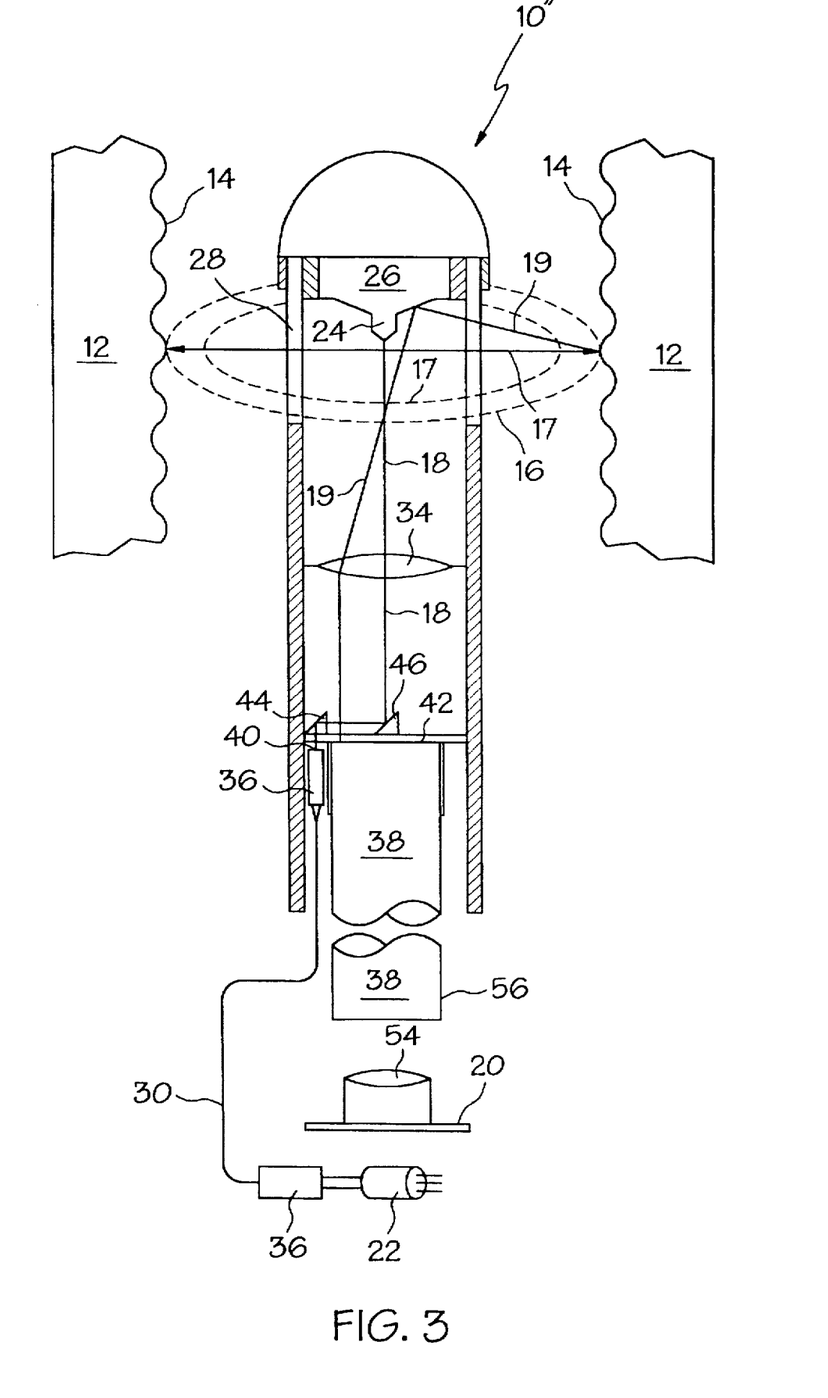
FIG. 3 is a diagrammatic, side elevation view, partially in section, of a third embodiment of a probe in accordance with the present invention.

In accordance with another embodiment of the present invention, as shown in FIGS. 1–3, a probe that can be used with the method set forth above is provided. A probe 10 capable of insertion into a tubular structure 12 having an interior surface 14, such that the probe 10 does not contact the interior surface 14 of the tubular structure 12, for determining a physical characteristic of the interior surface 14 comprises a means for illuminating a cross-section 16 of the interior surface 14 with a disc of unfocused light 17 via a light beam 18 and a means for imaging the illuminated cross-section 16 as imaged light 19, as generally represented by the ray trace, from the interior surface 14 onto a photodetector array 20.

There are numerous means for illuminating that can be employed in the probes in accordance with the present invention. The requirements for the means for illuminating is that a cross-section be illuminated on the interior surface such that a disc of unfocused light illuminates the entire cross-section instantaneously, not by illuminating consecutive points of the cross-section, and that the width of the disc of unfocused light does not change significantly over the desired range of the instrument. The desired range of the instrument preferably encompasses tubular structures having internal diameters in the range of from about fractions of an inch to several feet. Therefore, unlike instruments that use focused light, the probe of the present invention is not inherently limited in range of measurements of internal diameters by the disc of light (e.g., see FIG. 2). The desired result for the probes of the present invention is a properly imaged illuminated cross-section 16 ultimately on the photodetector array 20, a light beam 18 which doesn't spill over the tip 24 of the mirror 26 such that the light beam 18 is directed from the tip 24 at an angle of 90° to the axis of the probe and 360° radially by reflection off the tip 24, and a disc of unfocused light 17, which has a width that does not change significantly over a significant range of interior surface cross-sections. This can be accomplished in several ways, examples of which are set forth below. Furthermore, the illuminated cross-section created from the disc of unfocused light is an instantaneously sampled, static image rather than a repetitively sampled image.

By way of example, without desiring to be limited, several means for illuminating, or in other words, directing a light beam 18, preferably a laser beam, more preferably a donut profile laser beam, from the light source 22 onto the tip 24 of the mirror 26 such that the light beam 18 is projected 90° to the axis of the probe 10 and 360° radially by reflection off the tip 24 of the mirror 26 to illuminate a cross-section 16 of the interior surface 14 of the tubular structure 12 are shown in FIGS. 1–5.

In accordance with one embodiment of the present invention, as shown in FIG. 1, the means for illuminating includes a light source 22 and a mirror 26 having a tip 24, such that a light beam 18 from a light source 22 is directed onto the tip 24 and through a window 28, preferably a long "lighthouse" or cylindrical window (e.g., glass tube), in the probe 10, such that a disc of unfocused light 17 is directed from the tip 24 through the window 28 and illuminates a cross-section 16 of the interior surface 14. Preferably, the light beam 18 is directed onto the tip 24 of the mirror 26 by passing the light beam 18 from the light source 22 through an optical fiber 30 and through a fiber collimator 32.

In another embodiment of the probe 10 of the present invention, generally designated 10', as shown in FIG. 2, the means for illuminating used in probe 10' eliminates some of the optical obstructions of the probe 10 in FIG. 1. In FIG. 2, the placement of the mirror 26 and the fiber collimator 32 are reversed from that of the mirror 26 and the fiber collimator 32 of the probe 10 in FIG. 1. This configuration is especially useful for off-line measuring. An alternative component arrangement is to replace the fiber collimator 32 in FIGS. 1 or 2 with a laser diode and associated optics to collimate the light. An indium-tin oxide transparent coating may be used over the window 28 to provide power to the laser diode. Two separate electrical paths would be necessary to provide power, such as separately along the inside and outside of the window 28. Preferably, the probe 10' in FIG. 2 is battery powered or the window 28 is coated with a transparent, conductive material, such as indium-tin oxide.

FIG. 3 illustrates yet another embodiment of the probe 10 of the present invention, generally designated 10". The means for illuminating used in the probe 10" includes a light source 22, a mirror 26' having a tip 24', a means for guiding the light beam 18 from the light source 22 onto the tip 24' of the mirror 26', and through a window 28 in the probe 10" such that a disc of unfocused light 17 is directed from the tip 24' and illuminates a cross-section 16 of the interior surface 14 of a tubular structure 12.

By way of example, without desiring to be limited, there are several means for directing the light beam 18 to the tip 24' of the mirror 26' that can be employed in probes such as the probe 10", as shown in FIG. 3. Two such means are described here, both of which allow the light beam 18 to pass through an imaging lens 34 on its way to the tip 24', of the mirror 26'. The imaging lens 34 affects the incident light beam 18. The combined effect of the divergence and convergence of the light beam 18, prior to being incident on the imaging lens 34, and the imaging lens 34 itself, determines the ultimate width of the disc of unfocused light 17 in the probe 10" of FIG. 3. The focal length and position of the imaging lens 34, and the spot size and divergence (or convergence) of the light beam 18, can be chosen such that they work in concert to produce the desired result for the probes as described above. If the focal length and position of the imaging lens 34 are chosen for nominal imaging of the illuminated cross-section 16 over the desired range of the probe 10", then the light beam 18, as it exits the fiber output coupling optical element 36, can be slightly diverging, collimated, or converging to a focus at a point no closer than a focal distance away from the imaging lens 34. Those skilled in the art of optical design can determine the appropriate combination of these parameters to accomplish the desired results for the probes. This combination of parameters also allows for design variations which affect the range and resolution of the probe 10".

The first method for directing the light beam 18 onto the tip 24' of the mirror 26' in accordance with the probe 10" of FIG. 3 starts with a light source 22, preferably a diode laser, coupled into an optical fiber 30 using standard methods such that a sufficient amount of the light beam 18 from the diode laser is launched into the fiber 30. The fiber 30 is positioned external to an image conduit 38 with its output face 40 near the input face 42 of the image conduit 38. Light beam 18 is coupled from the fiber 30 with a fiber output coupling optical element 36, preferably a gradient index rod lens or standard miniature lens, to form a collimated, diverging, or converging light beam 18. The light beam 18 is directed parallel to the cylindrical axis of the probe 10" with two reflecting prisms, one an internal reflecting prism 44 and the other an external reflecting prism 46, or some other pair of reflecting surfaces. The light beam 18 then passes through the imaging lens 34 and reflects off the tip 24' of the mirror 26'.

Figure 4:
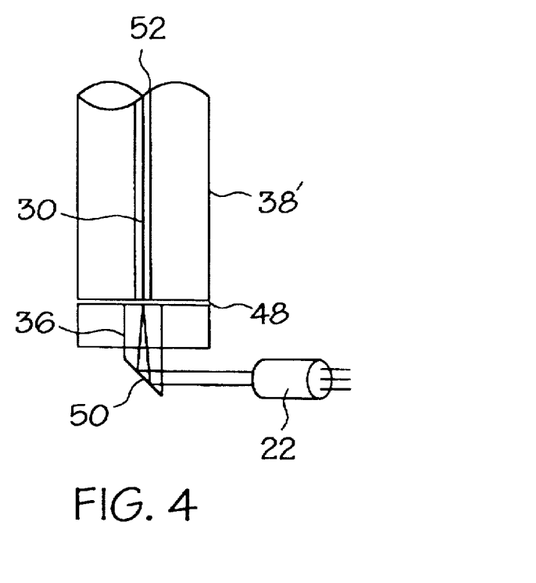
FIG. 4 is a diagrammatic, side elevation view, partially in section, of a fourth embodiment of a means for illuminating in accordance with the present invention.
Figure 5:
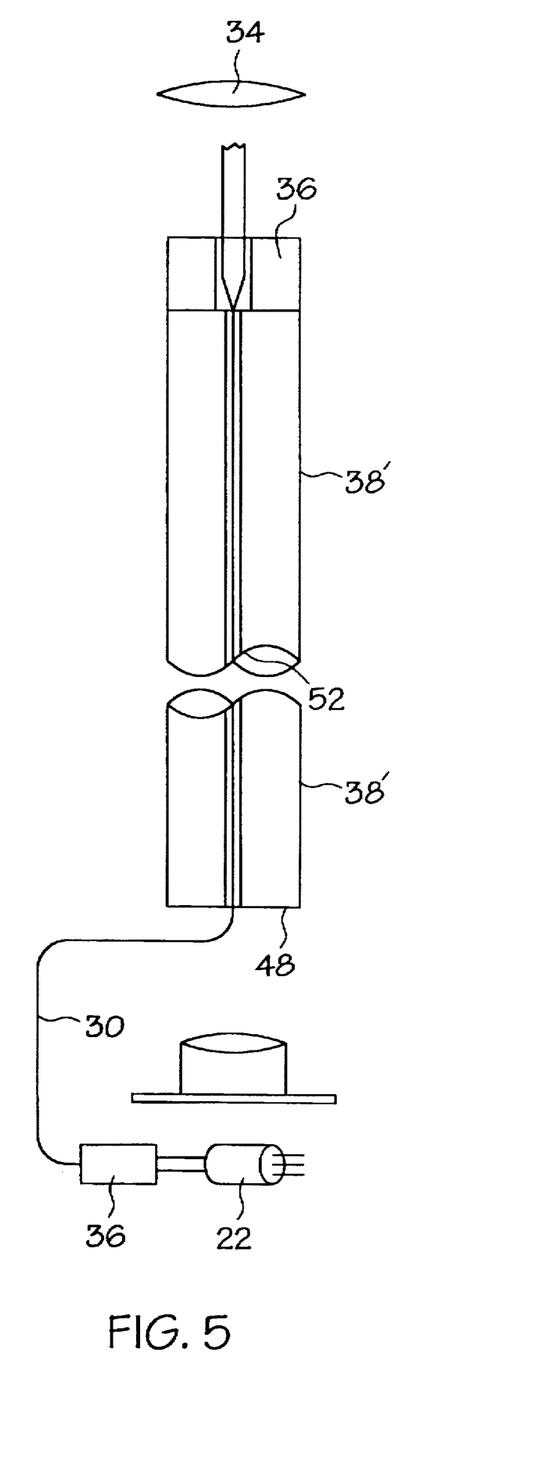
FIG. 5 is a diagrammatic, side elevation view, partially in section, of a fifth embodiment of a means for illuminating in accordance with the present invention.

The second method, as shown in FIG. 4, for directing the light beam 18 onto the tip 24' of the mirror 26' in accordance with the probe 10" of FIG. 3 consists of a light source 22, preferably a diode laser subsystem, and optics for producing a nearly circular, collimated, and non-astigmatic beam of light of a certain diameter by standard methods. The light beam 18 is incident from 90° to the cylindrical axis of the probe 10", near the rear 48 of the image conduit 38', onto a reflecting prism 50 or other mirrored surface. The reflected light beam 18 enters a fiber input coupling optical element 36, preferably a gradient index (GRIN) rod lens of an appropriate pitch, or a standard miniature lens, which focuses the light beam 18 into the end of an optical fiber 30. The fiber 30 is threaded up through the center of a special image conduit 38' that has a hollow capillary 52 running the full length of the conduit 38'. The output of the fiber 30, is incident on a fiber output coupling optical element 36, preferably a GRIN rod lens of an appropriate pitch, or a standard miniature lens, as shown in FIG. 5, to form a converging or diverging light beam 18 as discussed above. The light beam 18 then passes through the imaging lens 34 as before. FIG. 5 also shows an alternative embodiment of a light source 22, preferably a laser diode, coupled through a coupling optical element 36 into a fiber 30 which is threaded into capillary 52.

By way of example, without desiring to be limited, several means for imaging the illuminated cross-section 16 from the interior surface 14 to the photodetector array 20 are shown in FIGS. 1–5. Preferably, the imaging occurs at an angle to the plane of the disc of unfocused light (i.e., triangulation). In accordance with one embodiment of the present invention, as shown in FIG. 1, the means for imaging includes the window 28 in the probe 10, an imaging lens 34, an image conduit 38 and a lens 54. The primary function of the imaging lens 34 in FIGS. 1 and 3 is to form an image of the illuminated cross-section 16 via the imaged light 19 onto the input face 42 of the image conduit 38. The illuminated cross-section 16 is imaged by the imaging lens 34 after passing through the window 28.

An alternative component arrangement is to replace the image conduit 38 as shown in FIG. 1 with a camera 55, such as a charged coupled device (CCD), such that the lens 54, the camera lens, replaces the short focal length imaging lens 34. The probe 10' of FIG. 2, unlike the probes 10 and 10" of FIGS. 1 and 3, respectively, does not require an image conduit 38 for transmitting the imaged light 19 from the illuminated cross-section 16 onto the photodetector array 20. As shown in FIG. 2, the illuminated cross-section 16 is imaged by the lens 54 directly onto the photodetector array 20 after passing through the window 28.

The window 28 is a structural element that prevents contaminants from entering into the interior of the probe and fouling the mirror and other components of the probe. The window 28 in combination with an imaging lens 34 that has a relatively short focal length allows an illuminated cross-section 16 to be imaged directly onto the image conduit 38 through the imaging lens 34, as shown in FIG. 1, without the necessity for an imaging mirror 26' as shown in FIG. 3. The image conduit 38 then transmits the image from its input face 42 to its output face 56 where the image is re-imaged onto the photodetector array 20 via lens 54. The cylindrical glass "lighthouse" window 28 is just exterior to the mirror 26 or 26', as shown in FIGS. 1–3. The window 28 has sufficient optical quality such that no significant distortion or attenuation of the light beam 18 is exhibited. The range of the probe of the present invention is such that optical quality of the window 28 is not a stringent parameter. Antireflection coating of the window 28 improves performance by reducing stray reflections and optical loss, but the probe 10 works without these coatings. Antireflection coatings on the imaging lens 34 and the transmitting surfaces of the internal reflecting prism 44, and high reflection coatings on the hypotenuse faces of the prisms, also enhances performance. The window 28 can be of any size, so long as the window 28 is a "lighthouse" window and the window 28 allows the disc of unfocused light 17 to illuminate the interior surface 14 of the tubular structure 12 creating an illuminated cross-section 16 and permits the illuminated cross-section 16 via the imaged light 19 to be imaged ultimately onto a photo detector array 20.

The image conduit 38 has an input face 42 and an output face 56. The image conduit 38 is a coherent array of optical fibers, which transmits a sufficient amount of the light incident on the input face 42 to the output face 56 by multiple total internal reflections within the fibers to the photodetector array such that the image of the illuminated cross-section can be detected by the photodetector array. This process maintains the spatial relationship of the image on the input face 42 such that the image on the output face 56 is identical, except for minor distortions due to imperfections in the image conduit 38, and thus the image conduit 38 functions to transfer the image from one plane in the optical system to another plane. Other methods or components that accomplish this task of transferring the image are not outside the scope of the present invention. For example, the image conduit 38 could be replaced by a series of lenses, a gradient index rod, etc. The image conduit 38 can be of any length so long as the optical losses in the conduit 38 are not so large as to render the output image undetectable or unreliable for profiling. In addition, the image conduit 38 can be bent in order to change the direction of the transmitted image.

Since the image conduit 38 can be manufactured with bends up to a certain radius of curvature without sacrificing its ability to transmit an image, any desired arrangement of such a bent light path could be accommodated. Alternatively, a flexible fiber bundle, surrounded by a flexible sheath, could be used in place of the rigid image conduit for insertion into pipes or tubes of arbitrary curvature.

The image at the output face 56 of the image conduit 38, as shown in FIGS. 1 and 3, is re-imaged through the lens 54 onto the photodetector array 20. The image thus produced contains the shape of the cross-section being measured and therefore, dimensional aspects such as radius, diameter, and circumference. The image is essentially the interior cross-section of the tubular structure 12 being measured scaled up or down by the magnification of the optical system. Proper calibration, using precision cylinders of known diameters, provides the relationship between radial distance from the axial center of the probe 10 and corresponding pixels of the photodetector array 20. In other words, while calculation of a physical characteristic of the illuminated cross-section 16 can be made by analyzing the optical paths, the physical characteristic can also be determined by making with the described probe 10 a series of measurements of the physical characteristic, such as diameters of a number of cylinders of known interior diameter and driving a conversion factor to convert pixels to distance measurements.

Unlike the probes 10 and 10" of FIGS. 1 and 3, respectively, in the case of the probe 10' of FIG. 2, the illuminated cross-section is directly imaged through the lens 54 onto the photodetector array 20 without the necessity of an image conduit 38.

The image of the illuminated cross-section can be readily captured directly off the photodetector array 20 using a frame grabber and software that compares the image to known standards, or to other portions of the image of the illuminated cross-section, without human intervention. The digital image data can be input directly into a process control computer for use in on-line process control of manufacturing processes. Those skilled in the art will appreciate that other methods for scanning and manipulating the image from the photodetector array 20 are within the scope of the present invention. Generally, the image can be processed by any manner known in the art. For example, one method known in the art is as follows. The photodetector array provides a continuous video signal which can be fed to a video monitor and to a frame grabber. When triggered by the user or by a computer program, the frame grabber grabs and stores a single frame of video as an array of pixel intensity values. This array of numbers contains relatively large intensity values for those parts of the image where the interior cross-section is illuminated. This array of numbers can be processed by a computer program to find those pixels which represent the illuminated cross-section. This could be accomplished, for example, by edge detection if the image of the cross-section tends to saturate the detector, or by peak detection if the image of the cross-section does not saturate the detector. More sophisticated image processing could also be employed.

Figure 6:
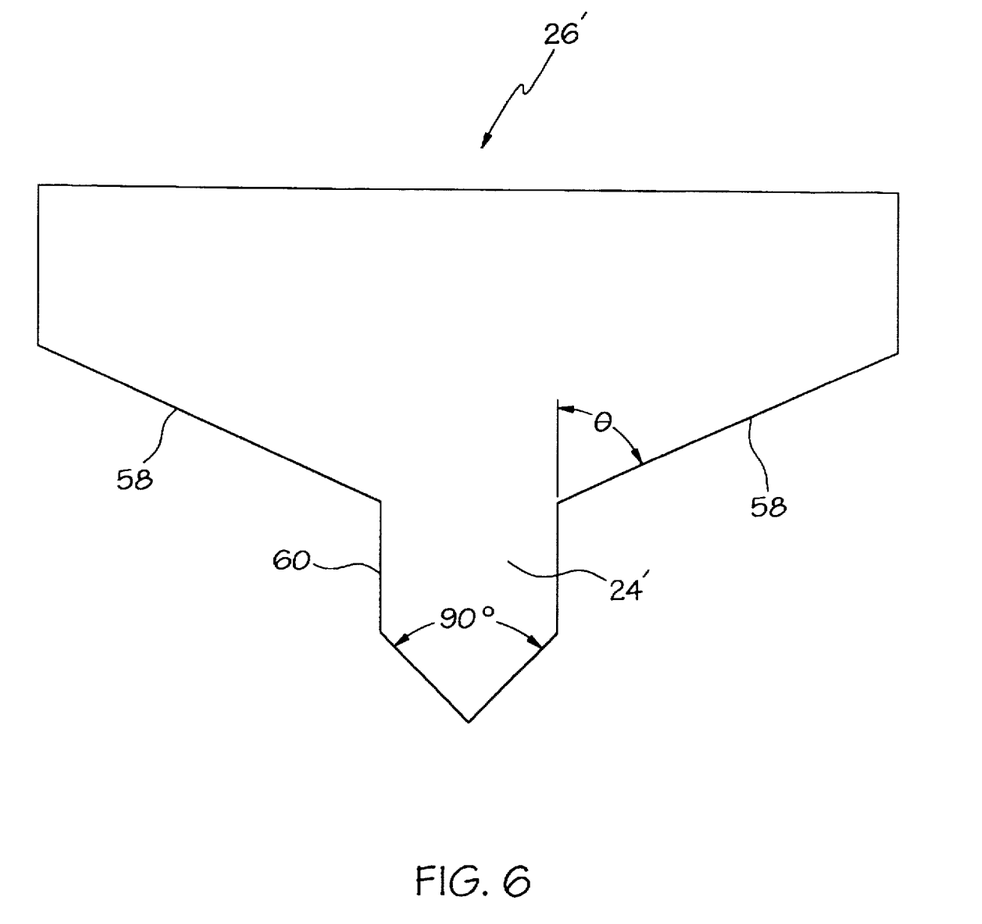
FIG. 6 is an enlarged view of the preferred mirror used in FIG. 3.

The mirror 26 of the present invention is preferably a cone mirror such that a light beam 18 can be projected 90° to the axis of the probe 10 and 360° radially by reflection off the tip 24 of the mirror 26 such that an illuminated cross-section 16 is created on the interior surface 14 of the tubular structure 12. Preferably, the mirror is supported by any suitable material and/or method known in the art. In cases where the illuminated cross-section 16 can not be imaged directly onto a photodetector array 20 or an image conduit 38, then the mirror 26 preferably is configured such that the illuminated cross-section 16 can be imaged back onto a portion of the mirror 26, other than the tip 24, and be subsequently imaged onto an image conduit 38 or photodetector array 20, a preferred mirror in such a case is shown in FIG. 6. Examples of the mirrors used in the present invention are obtainable from manufacturers who employ diamond turning. Examples of such manufacturers are OFC Corporation-Diamond Turning Division in Keene, N.H., and Laser Power Optics in Plymouth, Mich.

FIG. 6 illustrates an embodiment of a cone mirror, generally designated 26', preferably utilized in the probe 10" of FIG. 3. The cone mirror 26' includes a laser illumination portion represented by the tip 24' and an imaging portion represented by the beveled sides, generally designated 58. Preferably, the cone mirror includes a cone with a 90° full cone angle extended on a pedestal away from the remainder of the cone wherein the remainder of the cone has a full cone angle greater than 90°. This has the effect of translating the field-of-view such that the distance range of the probe 10" can be increased away from the axial center of the probe 10". The length of the pedestal 60 combined with the angle θ of the beveled sides 58 determine the range of distances which can be measured. The length of the pedestal and the angle θ are co-dependent in that in combination they determine the range and resolution. Better resolution is achieved as the length of the pedestal increases at the expense of the range of the imaged illuminated cross-section decreases. Better range is achieved as the length of the pedestal decreases at the expense of the resolution. By way of example, without desiring to be limited, a suitable length of the pedestal is about 6 millimeters and a suitable angle for the angle θ is about 65°. A cone mirror with an imaging portion is not necessary for the probes illustrated in FIGS. 1 and 2 because the imaged light 19 from the illuminated cross-section 16 is imaged directly onto the image conduit 38 or photodetector array 20 through an imaging lens 34. However, a cone mirror having an imaging portion is necessary for the probe illustrated in FIG. 3 because the image conduit 38 and photodetector array 20 are not capable of receiving the direct imaged light 19 from the illuminated cross-section 16.

Preferably, the probe 10 is generally housed in a protective tube 62 made from a suitable material, preferably stainless steel, except where a "lighthouse" window is required. The "lighthouse" window also functions as a protective tube preventing contaminants from entering into the probe 10. The tube 62 is segmented with threads to allow for ease of assembly. The longest section houses the image conduit 38, if any, the majority of the optical fiber 30, the fiber input and output optical elements 36, turning prisms, and fixtures for attaching the parts to one another. Preferably, the probe 10 is manufactured such that the components of the probe 10 are in alignment. However, an alternative is to employ alignment screws which can adjust the pointing of the light beam 18 such that the light beam 18 becomes centered on the tip 24 of the mirror 26. The adjustment works by translating the end of the conduit 38 assembly perpendicular to the cylindrical axis of the instrument. A second section provides for mounting and positioning of the imaging lens 34. The imaging lens 34 is held in place with threaded inserts which can be adjusted for proper lens positioning. The third section provides a base to which the lighthouse window 28 is bonded. The mirror 26 is bonded to the window 28 and a protective nose cone 66 is bonded to the mirror 26. During construction, the axes of the mirror 26 and the lighthouse window 28 have to be brought into alignment so as to eliminate ghost reflections caused by tilt misalignments.

Figure 7:
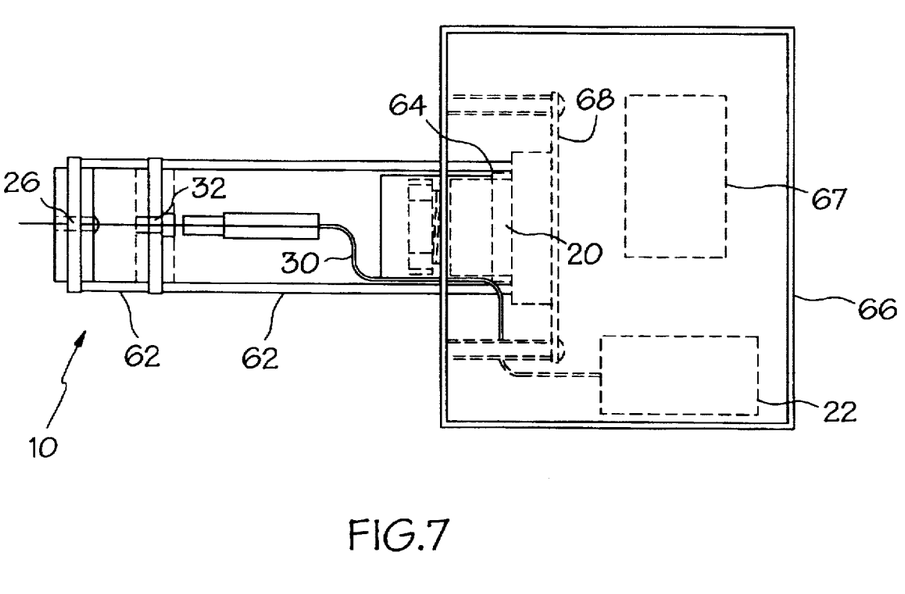
FIG. 7 is a schematic illustrating a preferred embodiment of the probe of the present invention.

As shown in FIG. 7, the rear end 64 of the tube 62 is threaded into a protective box, generally designated 66, preferably a metal or plastic box which houses the electronic components of the probe 10, namely, the photodetector array 20, diode laser system (i.e., light source 22), power supply 67 and electronic signal processing circuitry 68. Electronic signal output and power input jacks (not shown) are mounted in the sides of the metal box. The image from the photodetector array is captured with a frame grabber (80), which can reside inside the box or in an external signal processor or computer. The electronic image frame is processed for the desired output using standard methods. Since the image of the illuminated cross-section 16 is inverted by the imaging lens, the image can be reinverted by the image process software to present an erect image for visualization or plotting. The electronic video signal from the photodetector array can be connected to a video monitor in addition to the frame grabber for direct visualization of the illuminated cross-section 16. This feature can assist in alignment, performance monitoring, and troubleshooting of the instrument.

Figure 8:
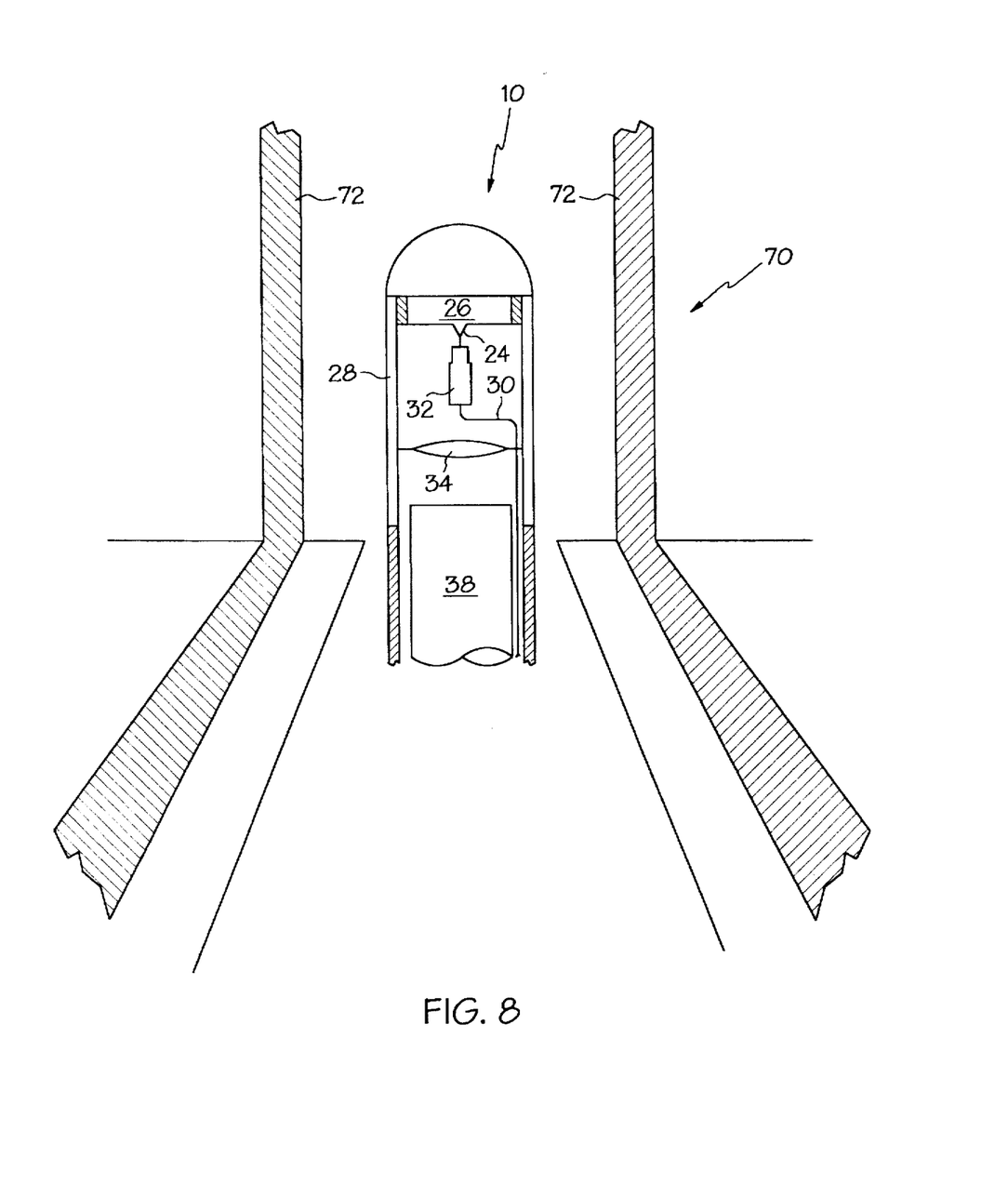
FIG. 8 is a partial schematic illustrating the probe of the present invention in use in an extruder head.

For on-line measuring during an extrusion process, the probe of the present invention, generally designated 10, can be inserted into a die 70, preferably through the "air hole", as shown in FIG. 8. The probe 10 is capable of taking measurements as a hose 72, or other tubular structure, is being extruded. The probe 10 of the present invention permits use of temperature sensitive lasers and detectors because such lasers and detectors can be located outside of the tubular structure, in this case the hose 72, or outside the entire extruder (not shown). This is advantageous for determining interior cross-sectional profiles of high temperature work pieces that are formed by an on-line process.

Generally, the components used in the probes of the present invention are known in the art. The choice of components of the probes can limit the maximum operating temperature of the probe. Therefore, by way of example, without desiring to be limited, if epoxies are used in bonding, the temperature limit is approximately 250° C. If epoxies are replaced by higher temperature bonding agents or mechanical fasteners, gradient index materials are limited to approximately 350° C. In the absence of gradient index materials, commercial fused glass-to-glass image conduit material is limited to approximately 450° C. Any aluminum parts, such as the cone mirror would melt at approximately 650° C. A copper cone mirror would melt at approximately 1000° C. If all glass components are composed of fused silica, maximum temperatures are approximately 900° C. Those skilled in the art will appreciate that other suitable materials could be used for the components and that such materials are not outside the scope of the present invention. If temperature permits, plastic lenses can be used.

Any suitable light source can be used. Preferably, the light source is selected from the group consisting of lasers, or light emitting diodes (LEDs), more preferably a diode laser. In certain cases, it is desirable to control the output power of the laser to avoid image saturation in the detector.

Preferably, the photodetector array is selected from the group consisting of a charged coupled device (CCD) array, an integrated CCD camera, or other suitable array detector or camera, more preferably, a cylindrically packaged CCD camera. One example of a cylindrically packaged camera is commercially available from Toshiba under the name IK-M41MA.

Preferably, the disc of unfocused light is produced by a nominally collimated light source, such that the light is unfocused and the disc of light has a width that does not change significantly over a significant range of interior surface cross-sections. The unfocused light probes of the present invention avoid the inherent limitations associated with stationary focused light probes. Stationary focused light probes have to be designed and manufactured for tubular structures having specific narrow ranges of diameters, thus requiring numerous probes that have limited ranges to measure tubular structures having various diameters whereas only one unfocused light probe of the present invention is required to measure the same tubular structures.

By way of example, without desiring to be limited, the physical characteristics that can be measured include interior cross-sectional dimensions, interior surface elements, such as imperfections (e.g., weld lines) or components (e.g., grooves in a gun barrel). Preferably, the physical characteristics measured are cross-sectional dimensions of the interior surface of a tubular structure. The probe can measure in two dimensions. Any set of two-dimensional characteristics in a cross-sectional plane can be captured and analyzed. For example, cross-sectional planes can be round, oval, rectangular, or irregular in shape. Therefore, the illuminated cross-section of the interior surface of the tubular structure can be of any shape. Typical results might include: minimum, maximum, and average diameter, roundness, squareness, taper, degrees of arc, total area, etc. Other results might include: Go-NoGo versus specifications, and deviation from specifications. Those skilled in the art will appreciate that the measuring or analyzing of other physical characteristics of the interior surface are not outside the scope of the present invention.

The probes of the present invention are capable of measuring tubular structures having various internal diameters ranging from relatively small to large diameters. Preferably, the tubular structures have internal diameters in the range of from about fractions of an inch to several feet.

The probes of the present invention can be used to provide three-dimensional profiling of the interior surface of the tubular structure by moving the probe along the cylindrical axis of the interior surface or by moving the tubular structure along the cylindrical axis of the probe.

For off-line applications, the probe is preferably used in conjunction with a gauging stand or gauging fixture. In addition, the probe can be used in conjunction with outside diameter gauges to compute wall thickness, concentricity and variations thereof.

Notwithstanding the above discussion directed to measuring tubular structures, the probe is equally effective at measuring non-tubular structures, such as channels on storm windows, rain gutters, and the like, including rolling of steel prior to it being welded into a tubular structure.

Having described the present invention in detail and by reference to preferred embodiments thereof, it will be apparent that modifications and variations are possible without departing, from the scope of the invention defined in the appended claims.

What is claimed is:

1. An apparatus for determining a physical characteristic of an interior surface of a tubular structure comprising:
a probe capable of insertion into the tubular structure without contacting the interior surface of the tubular structure, the probe having a means for illuminating a cross-section of the interior surface of the tubular structure with a disc of unfocused light and a means for imaging the illuminated cross-section from the interior surface onto a photodetector array.

2. The apparatus of claim 1 wherein the probe includes a window and the means for illuminating includes a light source and a mirror having a tip, a light beam from the light source being directed onto the tip through the window in the probe, such that the disc of unfocused light is directed from the tip onto the cross-section of the interior surface.

3. The apparatus of claim 2 wherein the light beam is a donut profile laser beam.

4. The apparatus of claim 2 wherein the mirror is a cone mirror.

5. The apparatus of claim 4 wherein the cone mirror includes a cone with a 90° full cone angle extended on a pedestal away from the remainder of the cone wherein the remainder of the cone has a full cone angle greater than 90°.

6. The apparatus of claim 2 wherein the mean s for illuminating further includes a means for directing the light beam from the light source onto the tip of the mirror.

7. The apparatus of claim 2 wherein the light beam is directed from the tip of the mirror at an angle of 90° to the axis of the probe and 360° radially by reflection off the tip.

8. The apparatus of claim 2 wherein the light source is selected from the group consisting of lasers, variable output-powered lasers and light emitting diodes.

9. The apparatus of claim 1 wherein the disc of unfocused light illuminates the entire cross-section of the interior surface instantaneously.

10. The apparatus of claim 1 wherein the means for imaging the light from the illuminated cross-section to the photodetector array includes an imaging lens, such that the illuminated cross-section is imaged by the imaging lens after passing through a window in the probe.

11. The apparatus of claim 1 wherein the means for imaging the light from the illuminated cross-section to the photodetector array includes an image conduit.

12. The apparatus of claim 1 wherein the physical characteristic is selected from the group consisting of cross-sectional dimensions and interior surface elements.

13. The apparatus of claim 12 wherein the physical characteristic is a cross-sectional dimension.

14. The apparatus of claim 1 wherein the photodetector array is selected from the group consisting of a charged coupled device array, an integrated charged coupled device camera, or other array detector or camera.

15. The apparatus of claim 14 wherein the photodetector array is a cylindrically packaged charged coupled device camera.

16. The apparatus of claim 1 wherein the imaging occurs via triangulation.

17. The apparatus of claim 1 wherein the illuminated cross-section is of any shape.

18. The apparatus of claim 1 wherein the disc of unfocused light is produced by a nominally collimated light source.

19. The apparatus of claim 1 wherein the disc of unfocused light has a width that does not change significantly over a significant range of interior surface cross-sections.

20. The apparatus of claim 1 wherein the disc of unfocused light is illuminated onto the interior surface from a stationary probe.

21. The apparatus of claim 1 wherein the probe can be used in on-line processes.

22. A method for determining a physical characteristic of an interior surface of a tubular structure comprising the steps of:

providing a probe capable of insertion into the tubular structure without contacting the interior surface of the tubular structure;

illuminating a cross-section of the interior surface with a disc of unfocused light emitted from the probe;

imaging the illuminated cross-section from the interior surface onto a photodetector array;

scanning the array to determine the output of the array; and comparing the output to a known standard output or to other portions of the image of the illuminated cross-section to determine the physical characteristic of the interior surface.

23. The method of claim 22 wherein the illuminated cross-section is of any shape.

24. The method of claim 22 wherein the photodetector array is selected from the group consisting of a charged coupled device array, an integrated charged coupled device camera, or other array detector or camera.

25. The method of claim 24 wherein the photodetector array is a cylindrically packaged camera.

26. The method of claim 22 wherein the disc of unfocused light is produced by a nominally collimated light source.

27. The method of claim 22 wherein the disc of unfocused light has a width that does not change significantly over a significant range of interior surface cross-sections.

28. The method of claim 22 wherein the disc of unfocused light is illuminated onto the interior surface from a stationary probe.

29. The method of claim 22 wherein the disc of unfocused light illuminates the entire cross-section of the interior surface instantaneously.

30. The method of claim 22 wherein the probe can be used in on-line processes.

31. The method of claim 22 wherein the means for illuminating includes a light source and a mirror having a tip, a light beam from the light source being directed onto the tip, and through a window in the probe, such that the disc of unfocused light is directed from the tip onto the cross-section of the interior surface.

32. The method of claim 31 wherein the light beam is a donut profile laser beam.

33. The method of claim 31 wherein the mirror is a cone mirror.

34. The method of claim 33 wherein the cone mirror includes a cone with a 90° full cone angle extended on a pedestal away from the remainder of the cone wherein the remainder of the cone has a full cone angle greater than 90°.

35. The method of claim 31 wherein the means for illuminating further includes a means for directing the light beam from the light source onto the tip of the mirror.

36. The method of claim 31 wherein the light is directed from the tip at an angle of 90° to the axis of the probe and 360° radially by reflection off the tip.

37. The method of claim 22 wherein the light source is selected from the group consisting of lasers, variable output-powered lasers and light emitting diodes.

38. The method of claim 22 wherein the means for imaging the light from the illuminated cross-section to the photodetector array includes an imaging lens, such that the illuminated cross-section is imaged by the imaging lens after passing through a window in the probe.

39. The method of claim 22 wherein the means for imaging the light from the illuminated cross-section to the photodetector array includes an image conduit.

40. The method of claim 22 wherein the physical characteristic is selected from the group consisting of cross-sectional dimensions and interior surface elements.

41. The method of claim 40 wherein the physical characteristic is a cross-sectional dimension.

42. The method of claim 22 wherein the step of scanning the array includes a frame grabber, which captures the image of the illuminated cross-section.

43. The method of claim 22 wherein the step of comparing the output includes processing the information from the output using a computer program.

44. The apparatus of claim 9 wherein said photodetector array detects the entire cross-section of the interior surface.

45. The method of claim 29 wherein the photodetector array detects the entire cross-section of the interior surface.

46. The method of claim 22 wherein the disc of unfocused light is illuminated onto the interior surface from the probe as the probe is translated along the axis of the tubular structure.

47. The apparatus of claim 1 including means for translating said probe along the axis of the tubular structure.

* * * * *